Figure 1:
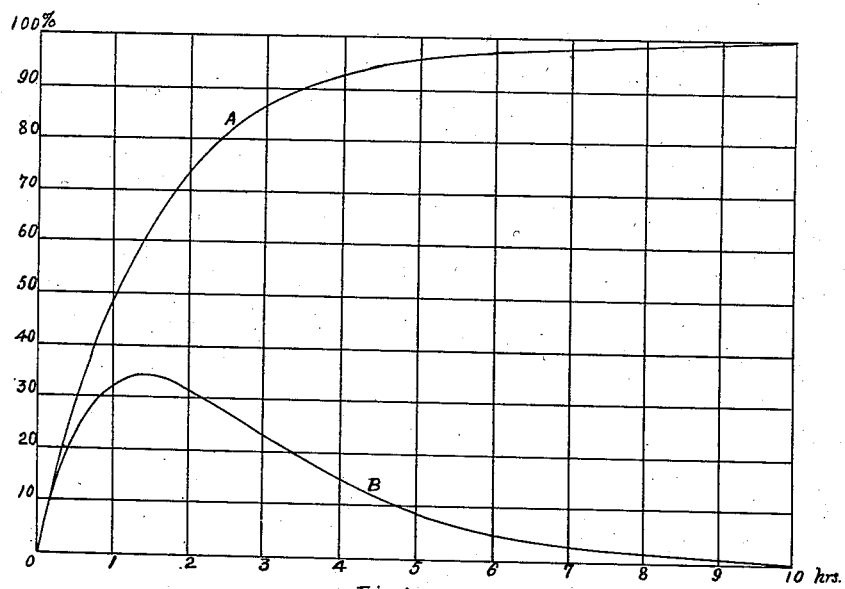

Nov. 26, 1940.                A. M. THOMSEN                2,222,885
                         UTILIZATION OF PLANT WASTES
                           Filed March 1, 1937        3 Sheets-Sheet 1

INVENTOR.
Alfred M. Thomsen

Nov. 26, 1940.   A. M. THOMSEN   2,222,885
UTILIZATION OF PLANT WASTES
Filed March 1, 1937   3 Sheets-Sheet 2

INVENTOR.
Alfred M Thomsen

Patented Nov. 26, 1940

2,222,885

UNITED STATES PATENT OFFICE 2,222,885

UTILIZATION OF PLANT WASTES

Alfred M. Thomsen, San Francisco, Calif.

Application March 1, 1937, Serial No. 128,558

5 Claims. (Cl. 127—37)

The term "plant waste" as used herein is meant to include the entire discard from the vegetable kingdom, from the trees of the forest to tender plants of the field and garden. The forest and mill waste of the lumber industry, the straw and cornstalks of the farmer, the bush-like cotton plant of the cotton planter, the bagasse of the sugar cane industry, and other types of plant waste such as the stumps and leaves of the pineapple and artichoke; are therefore alike included within the scope of this term.

The amount of this waste is appalling, often exceeding by far the percentage that man has been able to utilize from the plant. In the lumber industry it is not uncommon to see less than 30% of the total plant reduced to the form of merchantable materials. The weight of the straw and stalks produced in the raising of wheat and corn is several times the weight of the harvested grain. Such illustrations can be produced in almost every direction of human endeavor within the confines of the vegetable kingdom.

While the origin of these various types of plant wastes is most diverse, yet there is a common bond for they consist in general of more or less lignified cellulose, starches, and sugars.

Subordinately, they contain, of course, fats, oils, waxes, resins, etc., but from the standpoint of weight the three substances enumerated in the last paragraph are the important ones. Of these three in turn the most important from the quantity standpoint is the lignified cellulose for it has often been said that in the building of the plant, cellulose functions as the building blocks, the lignin etc., as the cement; while the function of the protein is to supervise and direct the building.

Be that as it may, it is safe to assume that both the starch and cellulose were originally formed from the sugars that in water solution constitute the life blood of the plant. Such being the case it is not surprising that the aim and object of many investigators has been to reverse this process and to re-convert both starch and cellulose into edible or fermentable sugars.

It is a well known fact that this desirable object can be obtained by digesting the cellulose and starch with dilute acid under suitable conditions of temperature and pressure, but unfortunately the same forces that will convert cellulose into sugar will also destroy the sugar thus formed unless means be taken to circumvent this destructive action.

Similarly, as starch is converted into sugar far more readily than cellulose, it follows that before cellulose conversion has commenced much of the sugar already formed from the starch, as well as any sugar already present as such, will have been destroyed. The great difficulty that has mitigated against the success of such conversion has therefore been the need to operate with a process which is at the same time both constructive and destructive in its action.

The advantage sought in the conversion of starch and cellulose into soluble sugars is the ready separation thus effected between the lignin and other objectionable components and the sugars thus formed. While starch by itself is a very valuable foodstuff for both man and beast it loses such application entirely if its presence be accompanied by much lignified cellulose for this latter substance is not only indigestible but also irritating to the intestines of mammals.

There is, of course, a limited use for various types of plant waste in their crude form. The first of these is as fuel, both the sugar and lumber industry being independent of an outside supply of fuel. This utilization, while convenient enough, is nevertheless but a very low grade form of usage, and vast quantities could never be salvaged at all.

Destructive distillation has often been suggested, but its application has been practically limited to hardwood waste. Most types of plant waste are so low in the desirable products and the price has of late been so low that this form of utilization only requires passing mention. At its best it would leave as a residuum a mass of powdery charcoal for which no use save as fuel could be found.

The most advantageous use so far has been in the paper pulp industry. While it is true that most pulp today is made from prime wood yet much could be made from wood waste, but even at best the world's demand for paper is very small compared to the available supply, not over 2% of the amount of waste being usable in this manner. It will therefore be evident that the problem requires solution in an entirely different manner than any so far enumerated.

By the separation of converted starch and cellulose from the lignin residual an entirely satisfactory aspect is presented for the demand of the world for sugar is almost unlimited. Not only is it most important as food for both man and beast, starch being converted into sugar in the process of digestion, but it can be used in almost unlimited amount as the food for useful microorganisms, to wit: Yeast.

Very cheap sugar means very cheap alcohol with yeast as a by-product, but in addition the yeast itself may become the primary objective. In this manner it becomes possible to convert the sugar into high protein combinations of which the world now stands in great need. The proper culture, (German: "Wuchshefe") has the power to assimilate directly the nitrogenous salts added to the fermenting wort and thus produce a form of high desirable albuminoid, independent of area, climate, and other natural restrictions.

In such conversion, that of cellulose into sugar is by far the most important. While there is still sugar left in sugar cane bagasse, much starch in the plant structure of pineapple and artichoke, and some sugar in most woods; yet the chief ingredient of plant wastes is the lignified cellulose which as a skeleton supports the softer structure of the plant.

Conversion of cellulose into sugar and utilization of the residual lignin is therefore, commercially considered, of primary importance. The salvaging of starches and sugar prior to this step can then be considered as merely additive touches from the technical viewpoint. From the commercial standpoint, however, such salvage may become of the utmost value and will later on be dealt with more fully.

The state of the art as of today is best described by referring to the German practice on wood waste, generally called "Holzverzuckerung". The theoretical aspect is correctly represented by the curves in Fig. 1, Plate I, of the attached drawings, where A is the idealized curve and B shows the joint effect of conversion of cellulose into sugar and of the simultaneous destruction of said sugar. The percentage figures given on the vertical line are percentages of the total maximum yield, the horizontal line gives the duration of the cook in hours, the temperature being 340° F., and the acidity 0.4%.

In German practice two schools of thought have been developing side by side depending upon whether a dilute or a concentrated acid medium be employed for the cellulose conversion. In the older type, developed under pressure of the World War and hence referred to as the "Kriegsverfahren", a dilute acid medium was employed and wood was treated under a pressure of from 8 to 10 atmospheres until maximum conversion had been obtained. Owing to the rapid destruction of the sugar formed, the yield was less than 25% of theory and the process was therefore soon abandoned.

To improve on this state of affairs, strong acid was substituted and in the "Bergius-Rheinau Verfahren" the cellulose is treated in the cold with super-concentrated hydrochloric acid. The yield is much better but the process is far more costly than the one just described. Finally, at a recent date appeared the more modern and commercially successful "Scholler-Tornesch Verfahren" which is a reversion to the former technique with dilute acid.

To obviate as much as possible the decomposition of sugar, as indicated in the B curve of the diagram, a mechanical system involving "percolation under pressure" (Ger. "Druckpercolation") as distinct from the same action performed in a closed autoclave (Ger. "Geschlossenen Autoclaven"), has been introduced.

By the use of this modification the sugar wort is withdrawn, continuously or intermittently, from the percolator or digester and destruction of the sugar is thus much diminished. Fresh acidified water is admitted at one end of the digester, and the sugar wort is similarly withdrawn from the other end until the wood is exhausted and only a lignin residue remains in the percolator.

This residue is next discharged by suddenly unsealing a large aperture in the digester whereby the contained water in the residue exercises an explosive effect and produces an extremely rapid evacuation of the digester. The issuing mixture of steam and residue is passed through a cyclone for separation in the customary manner. Great mechanical difficulties were encountered before the process was placed on a practical operating basis, and much costly equipment is of course necessary.

During the percolation period the lignin forms a rather solid crust within the digester and but for the explosive discharge it would be very difficult to remove the residue. As long as no attempt is made to use the lignin for any purpose save as fuel for the process, this blasting of the residue into fine particles perhaps does no great harm but if the residue is to be submitted to subsequent treatment it would be very desirable if it could be obtained in a granular form.

In order to obtain a high yield of sugar and a granular form of lignin suitable for subsequent manipulation and at the same time to avoid the costly equipment and the mechanical difficulties inherent in the Scholler-Tornesch system I have devised a radically different procedure to which I have given the name of "Continuous saccharification".

In this method both the lignified cellulose and the hydrolysing medium are permitted to flow continuously through a series of digesters, the first of which is under the highest pressure and each one thereafter under progressively lower pressure until the magma is finally discharged from the last vessel at substantially atmospheric pressure.

Figure 2:
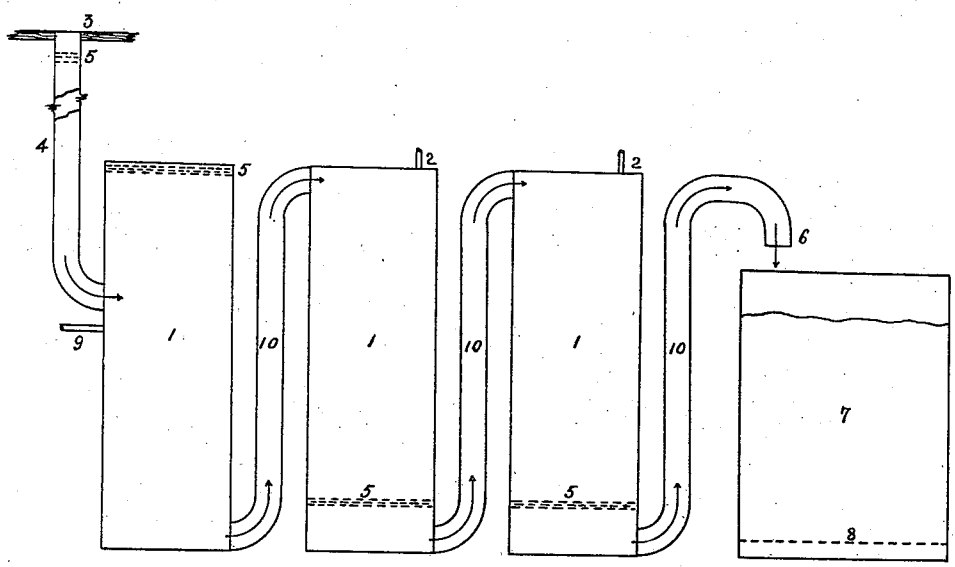

The entire procedure will be plain by referring to the diagrammatic representation in Fig. 2, Plate I, where I represents the digesters connected in series by the pipes 10 so that the feed may enter at 3 at a sufficient elevation to cause a flow through the entire series, the finished product being discharged at 6 into the filter-bottomed blowpit 7. In passing through the digesters the magma will experience a conversion of its sensible heat into latent heat of volatilization with consequent reduction in pressure and the steam thus evolved is relieved from the controlled exits 2. This in turn controls the liquor level 5 in the various units causing the magma to sink in the feed pipe 4, commensurate with the discharge at 6. The entire system is thus automatically kept in balance by the total head as indicated in the pipe 4 being equal to the summation of the various heads within the system. Such being the case it will become evident that the factor which governs the time of treatment is the rate of feed at the point marked 3, every addition causing a corresponding discharge.

The entering magma is systematically preheated by the various heat wastes within the series, thus: The cold magma is first permitted to abstract heat from the sugar wort which of necessity is below 212° F. It next absorbs the heat in the steam escaping from the vents 2, which thereby becomes condensed and permits of the recovery of valuable volatile substances contained therein. The final increment of heat is supplied by the steam line 9, by which high pressure steam enters the circuit.

In the blow-pit 7, which necessarily is in duplicate that one may drain and wash while another fills, the magma is thoroughly washed by displacement and the remaining solids, somewhat impoverished in cellulose are returned with fresh acid fluid to 3 and recycled until substantially exhausted. The sugar wort which drains through the filter bottom 8, is cooled to the desired temperature for the next step in operations by contacting it in counter-current effect with the incoming cold magma, so the actual heat loss in the system becomes a very small item. The wort will be dealt with later on, for it is, of course, only an intermediate product, attention being now centered upon the lignin, or better lignin-residual for it contains, of course, all such substances as are unacted upon by the acid medium with which it has been treated.

The granular residue will therefore retain resins, fats, and waxes in a more highly concentrated form than the original waste, and due to its porous structure it will be a very simple matter to remove such substances by means of proper solvents which will readily suggest themselves to the operator. For this reason, and also because of the great variation in composition of the various plant wastes no further details will be given here.

With or without such preliminary treatment, the proper method of utilizing the residue from the cellulose conversion is by means of destructive distillation. This proposal must not be considered merely as some additive wood distillation technique applied in an aggregational manner, for while the products are similar that is also the only comparative feature.

In wood distillation, it is now universally conceded that the methanol fraction is derived solely from the lignin, cellulose thus treated yielding none. The yield of acetic acid from the lignin is also small, the bulk being produced from the cellulose. It should therefore be very simple to estimate the yield from a certain species of wood by ascertaining its cellulose and lignin components by analysis.

Understanding these fundamentals, however, does not explain the fact that pine wood, which is higher in lignin content than oak wood, yields less than one-half as much of both acetic acid and methanol than the latter wood species. In fact, if the attempt be made to reduce a series of yield tables to some semblance of uniformity with the above stated fundamental fact, we shall obtain only inconsistencies in place of harmony.

The disturbing factor in calculating yield would seem to reside in the amount of unavoidable overheating which the products are subjected to during the little known but important period generally referred to as the "Exothermic reaction." In analysing the velocity of this reaction and the resultant temperature in the case of different wood species it will be evident that the combination of the lignin with the cellulose, not only in relative amount but also in the manner of its presence, is of fundamental importance.

Removal of the cellulose therefore leaves in the lignin residual an entirely new substance to deal with as regards the application of distillation. The products are: Charcoal, combustible gas, tar, a little acetic acid, and much methanol. The residual may be distilled in a continuous furnace in granular form or it may be compressed into blocks, which unlike similar blocks made from wood waste will issue in the form of compact charcoal, and distilled in the same manner as cord wood. In either case, by proper procedure which now will be more fully described, the exothermic reaction can be entirely controlled and an exceptional yield of volatiles obtained.

For the purpose of illustration let us assume that I employ a type of "Worm and Pipe" furnace such as were extensively used in the distillation of hardwood sawdust. In this device the fire was always at the bottom, the lowest pipe far the hottest as it was exposed both to the outside heat of the fire and also to the exothermic heat from the inside. The volatiles, comparatively cool were escaping at the top near the point of introduction of the fresh wood waste, and the very hot charcoal was discharged at the bottom.

From the standpoint of heat utilization this combination is about ideal but from the standpoint of controlling overheating it is the worst possible. I reverse matters entirely. The feed enters at the top as before and the charcoal at the bottom so that gravity can be used to simplify the movement of the charge within the furnace; but the volatiles issue at the bottom near the charcoal discharge and the direction of the heating gases are reversed so that the top pipe first receives the heat which then is lessened for each successive lower pipe thus actually cooling and not heating the exothermic zone.

In passing a granular lignin-residual through this type of apparatus in the manner just specified, heat is applied only where needed. In the upper part of the furnace where the charge is cool, the heating gases are hottest thus insuring a high rate of heat transfer. Little takes place inside save the evolution of steam and this now passes downward with the gradually heating charge until the exothermic stage is reached. Violent overheating is thus prevented by the presence of much steam within which owing to its high specific heat readily absorbs much of the heat generated. In addition, the inside of the pipe is now hotter than the outside and thus parts with a portion of its heat to the descending outside gases.

To further improve on this situation, I withdraw with a fan a portion of the relatively cool gas at the bottom of the furnace and return it to the top so that the intensity of the fire is correspondingly decreased. Instead of the operation in a continuous furnace the briquetted lignin may be distilled in a stationary position such as is indicated in the apparatus represented in Plate II, the fundamental principles as just enumerated being similarly observed.

Figure 3:
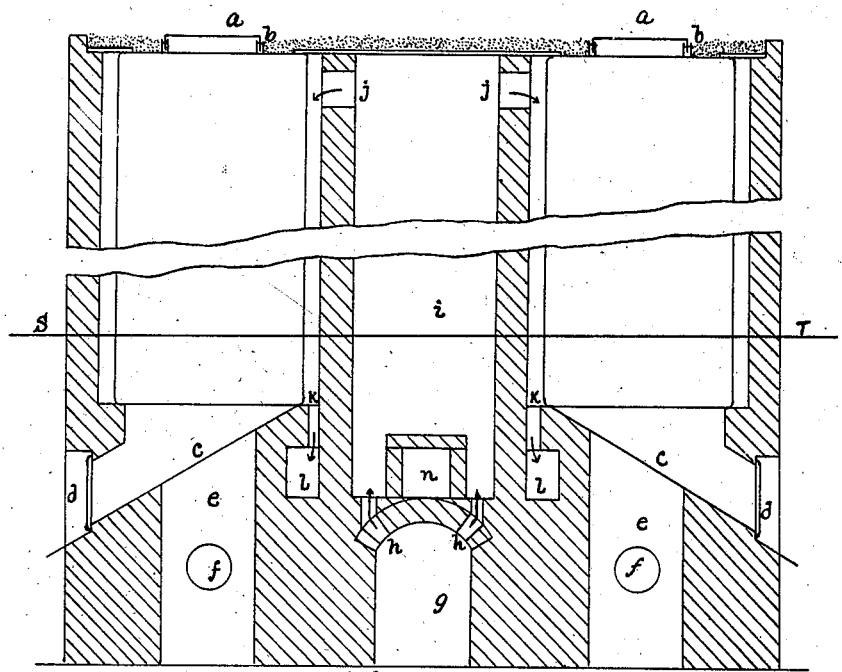
Figure 4:
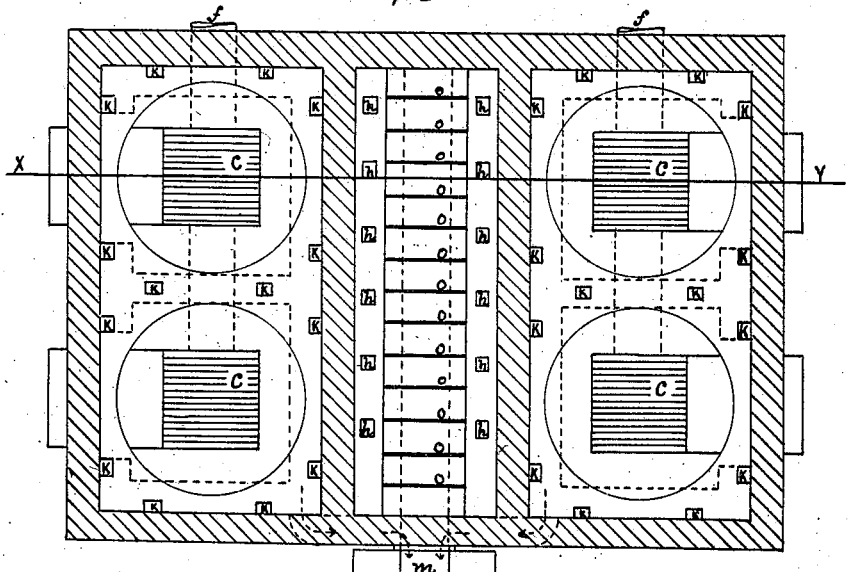

In the diagram a set of vertical retorts are represented, Fig. 3 being a cross section through XY, while Fig. 4 is a similar cross section through ST. The retorts are filled through the opening $a$, closed by the seal $b$. The gases produced in the operation passes through the grate $c$ upon which the charge rests into the supplementary chamber $e$, and finally escapes to the recovery system through the opening $f$. The finished charcoal is withdrawn to proper cooling devices through the door $d$. The heating of the retorts is effected as follows:

$g$ represents the fireplace from which the hot gases rise through the ports $h$ into the chamber $i$ where they are commingled with cooler gases withdrawn from the base of the retorts. These are blown by a fan (not shown) into the chamber or passage n which communicates with the chamber i by the grate slots o. The heating gases thus moderated in temperature next enter the space around the retorts proper by the aperture j at the very top and then descend around the retorts to their base, where they escape into the channel l through the ports k; a portion of the gas being re-cycled to n as before described.

Circulation of the gas within such retorts may not be quite adequate to control the exothermic heat but if a little additional superheated steam be continuously injected into the top of the retort the same function will be served as if it were produced by the charge itself as in the continuous furnace operation described at a prior place. The object is served whenever a sufficiently rapid current of gas is made to pass through the exothermic zone so that the excess of heat can be dissipated. Owing to the high specific heat of steam it is evidently the best substance for the purpose whether it be derived from the charge itself or specifically added.

The condensation of the volatiles may now be conducted in any orthodox manner but I prefer to apply a somewhat different technique and operate on the gas stream itself without any preliminary condensation, extracting from it both its tar and acetic acid content before any condensation is effected. I perform this solely by means of scrubbers, the first one being packed with acid resisting material and the second with fragments of limestone. In passing the first scrubber, which is plentifully irrigated with its own condensate the tar is substantially eliminated from the traversing gases.

The fluid in the scrubber will soon reach a composition equivalent to about 12% acetic acid, after which the total amount of acid in the gas stream will pass through the scrubber unabsorbed. Such a fluid is excellently suited to remove tar from the gas and at the same time to prevent choking in the device itself. All that is required to separate the excess of tar from the fluid is to pass it periodically through a settling tank where separation between tar and scrubbing fluid is readily accomplished.

When the tar free gas enters the limestone-packed scrubber it becomes rapidly fixed as calcium acetate which dissolves in the scrubbing fluid to any extent desired. As removal of the free acid causes a further precipitation of tar a settling tank for tar separation is also required on this circuit. In both of these scrubbers there is no real condensation. In the first there is instead a lively evaporation, so water must be added to compensate for such water loss. In the second there is practically a state of rest so as water is withdrawn with the calcium acetate an equivalent of water must be added to compensate.

The gas leaving the second scrubber is now virtually a mixture of saturated steam, fuel gas, and methanol vapor. Separation is made between the permanent gas and the condensable vapors by condensation but this is effected in two stages and thus a very strong concentration of methanol is produced. In the first condenser a relatively small amount of liquid is separated and in the second stage it is made complete. The condensate from the second stage as well as the first, is now used as condensing water for the first condenser and is made to serve by placing it under a vacuum. It therefore boils and evolves its methanol for subsequent condensation.

By operating in this manner it thus becomes possible to obtain all the volatile products evolved from the distilling lignin in a virtually automatic manner, thus greatly cheapening the expense of recovery. If the gases emanate from a continuous furnace the entire expense will be that of supervision, neither labor nor fuel being required, plus the small amount of crude limestone. Should it be desired to convert the acetate of lime directly to acetone for reasons to be described later on, then the finely divided calcium carbonate resulting can be returned to a scrubber and used in place of the limestone without introducing any particular change in the general set-up. In that event even the item of fresh limestone has been eliminated. Unless the latter be brought from a distance it will be cheaper to start with limestone for it is usually very cheap.

By causing the gas to furnish the heat for the distillation of its own condensate another marked economy is introduced, for the product thus directly obtained will only need rectification to become a salable product and this item of expense is likewise small.

Having thus disposed of the lignin-derived marketable products we now consider two that in general will be consumed in the plant, to wit: Fuel gas and charcoal. Of the latter there may at times be a surplus, particularly if the tar be also burned as fuel. In that event it may be desirable to incorporate the tar with the lignin in briquetting the same thus obtaining the retained volatiles in the tar on the next cycle, while the tar oils and tar coke are usefully employed. Such minor modifications will readily suggest themselves to the operator and need not be more carefully described.

Returning now to the sugar wort made from the cellulose and the method by which it was derived, we see from the curve B, Fig. 1, Plate I, the reason why only a very short time of treatment can be considered, as even at the one-half hour period there is a noticeable divergence between the idealized curve A and the curve B. At the close of the first hour the rate of destruction has almost overtaken the rate of conversion and at the next half hour it has been definitely passed. It is self evident, therefore, that the duration of the treatment will be somewhere within the first hour, the exact time to be determined from economic factors only obtainable in operation.

Theoretically, it should be possible to obtain a yield of 30% or better by operating in a closed autoclave in a similar manner to the conventional cooking of paper pulp, but the actual facts as obtained under the "Kriegsverfahren" were nearer 20% which caused the abandonment of the process. The blowing of a charge is accompanied by a tremendous heat loss in the steam evolved and from the rapidity of its production it is economically unsound to provide the means of its technical utilization.

How this difficulty is overcome by the continuous system I have called "Continuous saccharification" needs no further comment, but many other additional advantages are also secured. On the subject of yield alone the German system of "percolation under pressure" is quite efficient but as already elucidated this advantage is gained by the introduction of a relatively expensive process. As this latter process is in commercial operation with a yield of 80% of theory, a full comparison will now be made whereby the distinction will become clear and the technique of my invention become apparent.

The German system, so far applied exclusively to wood waste, packs the digester or "percolator" with a solid mass of material by a series of steam impacts or blows and refills again and again until completely full. It is then subjected to the action of hot dilute acid under the required pressure, in a continuous or intermittent flow until the cellulose has been removed and the lower part of the digester remains partly filled with a crusted, coherent lignin residue which in turn can only be removed by a steam explosion.

Contrariwise, in my process the contents of the digester are sufficiently fluid to remain in motion throughout the entire operation. It is therefore applicable to any type of waste of vegetable origin, much of which could never be worked on the German plan as it would pack into an impermeable mass defying the attempt of percolation. In the German system, separation between wort and lignin residual takes place within the digester and must therefore be accepted "as is", in my system it takes place in the blowpit outside the digester and is thus under perfect control.

Finally, the German system is necessarily on a "batch" basis while my system is continuous. This introduces a whole series of additional economic advantages of which freedom from mechanical difficulties, relatively inexpensive apparatus, and almost perfect heat-recuperation are the most important items. It will be evident that the gradual drop in pressure, gradual generation of steam, and final discharge under atmospheric pressure constitutes an important advance over the "explosive" technique of the German system. Its manifold other advantages will be plain to the operator and need not be further discussed. The advantage of the granular form of the lignin has been noted.

Proceeding in this manner it therefore becomes quite feasible to interrupt the digestion at a point where the only real effect has been the conversion of the cellulose into sugar and before the destructive effect becomes apparent. Referring again to the respective curves on the graph, Plate I, Fig. 1, it will be seen that it will be possible to stop at the point where both curves simultaneously cross the line of 10% yield, the charge being returned again and again until exhausted. The cost of such return will be very small owing to the perfect heat recuperation and will involve little more than the cost of pumping.

The one disadvantage inseparable from such a high yield resides in the fact that the sugar wort necessarily becomes correspondingly more dilute. This is of small importance if it be worked by fermentation but considerable if it be desired to evaporate for solid, transportable sugar. This fact, however will be somewhat modified by the use of the wort for an intermediate purpose between its production and final use as will now be explained in detail.

Attention has so far been focused upon the breaking up of the lignified cellulose into sugar and lignin with the proper disposal of the latter in a profitable manner. Owing to its relatively greater importance, this is proper but many types of plant waste contain also considerable starch and sugar. The preliminary removal of these substances is therefore required before the cellulose conversion can be considered or they would be summarily destroyed in the latter operation.

An excellent illustration is found in the leaf and stump residue from the pineapple plantation which often aggregates about 60 tons per acre and contains as much as 30% of starch. Nevertheless, because of the harshness of the accompanying woody fiber it can not be used as stock feed.

The conversion of starch into sugar by acid hydrolysis is an old established industry, corn syrup being a well known commercial product. The technique of today is based upon the fact that the raw material is a pure starch separated from all other impurities and it could not well be adapted to plant waste. My process, as already described for cellulose, is however perfectly suitable, it being necessary only to reduce the pressure to about 2 atmospheres, the customary pressure required for starch.

Figure 5:
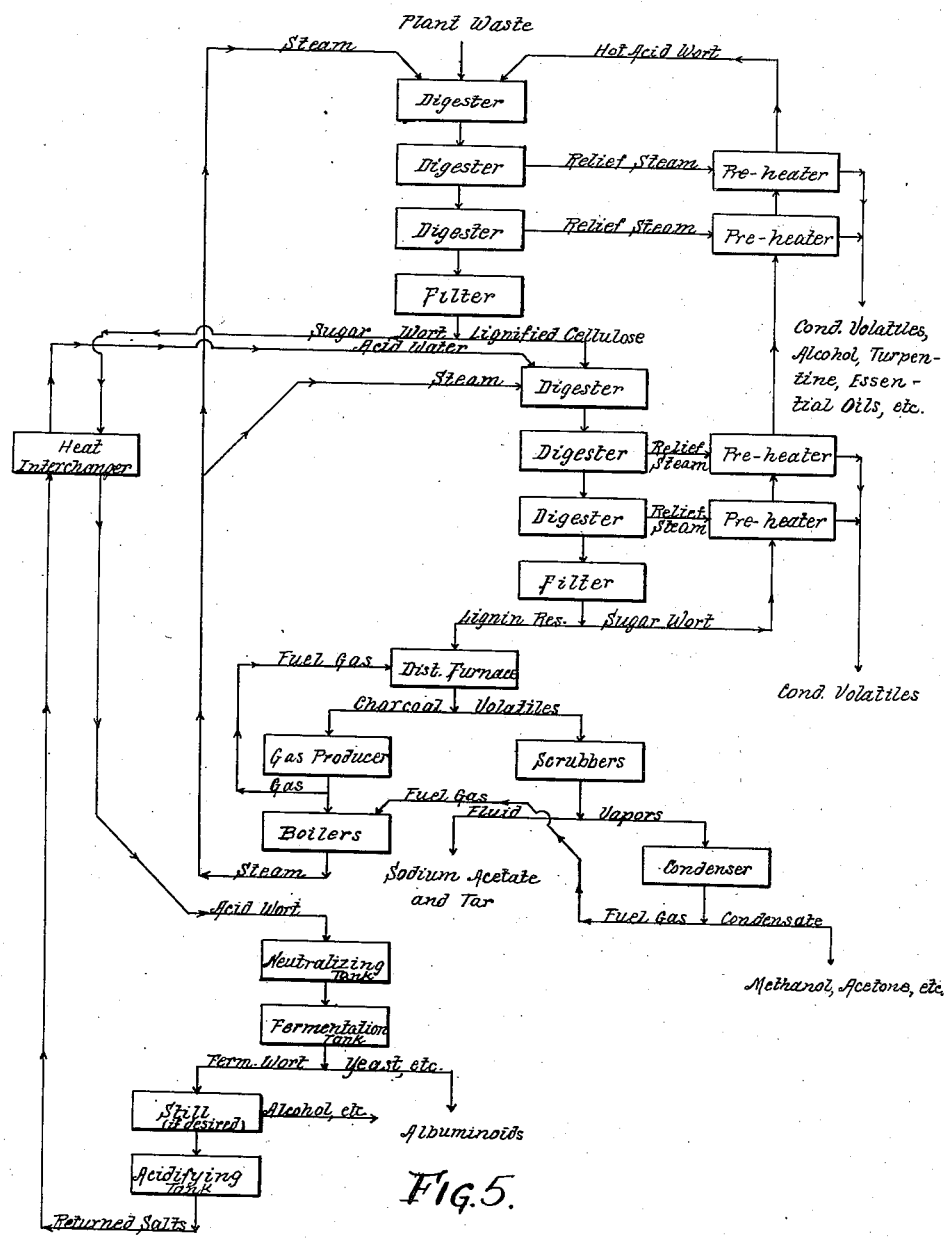

Used in this manner, my process therefore yields a sugar wort as before but in place of a lignin-residue it produces a residual of lignified cellulose for subsequent treatment at higher temperatures and pressures. An important economic link can now be established between the starch and the cellulose steps for it will be evident that the weak acid wort issuing from the cellulose conversion can be used directly for the hydrolysis of the starch. At the low temperatures employed the sugar loss will become relatively small and the sugar content of the wort will become considerably augmented. This combination will become plain by referring to the flow sheet, Fig. 5, where the plant waste is represented as initially treated with acid wort from the cellulose conversion step.

The recovery of minor constituents of economic value from the lignin residue, such as resins, fats, and waxes, has already been described. It will be plain that if the waste contain volatile constituents that are of value, such as turpentine from Conifers and oil from Eucalyptus, then these will be recoverable from the condensed steam issuing from the relief vents as also indicated in the above mentioned flow sheet.

While the sugar wort obtained as the result of hydrolysis of starch and cellulose contained in plant waste is in a sense the end of my process, nevertheless, such a substance is, commercially considered, but an intermediate product. For commercial use it must be transformed into something of greater value, and this in turn links both technically and economically with that part of my process already described. The following paragraphs are therefore not at all aggregational but constitute a true extension of my process which is needed in order to invest it with maximum commercial value.

The one exception to this contention occurs if the wort be simply neutralized and evaporated for syrupy or even solid dextrose; in that event the process may be considered as completely described at this stage. This commodity constitutes a very valuable food for both man and beast, but nevertheless such use of the wort is at best limited.

To employ the wort as food for micro-organisms is a vast and potentially unlimited field, the greatest application being in the production of power alcohol and in the conversion of the dextrose into albuminoids as already indicated in the opening paragraphs. Such conversion involves the use of fermentation with a proper culture for the purpose sought and of necessity gives rise to a fermented wort which may or may not contain volatile ingredients. Whatever type of fermentation be selected one requirement remains to be fulfilled, namely to enrich the wort when necessary with those mineral and nitrogenous substances in which it will in general be deficient. This will in general call for the addition to the wort of nitrogenous substances as well as of phosphates, potash, magnesia, etc. and these must always be present in excess of the actual requirements of the growing yeast.

The fermentation step is therefore linked with an unavoidable loss of such additive material but this can be completely obviated if the fermented wort, after yeast separation, be returned as the fluid portion of the acid medium which is used in the hydrolysis of starch and/or cellulose. If the fermented wort contain alcohol, this may be first removed by passing the wort through a still, as indicated on my flow sheet, but as this is optional it may be returned without such treatment in which event it will be self evident that the contained alcohol will be obtained from the relief vents as also indicated on the flow sheet. In the latter event, not only is the additive material completely returned to the circuit but the volatile products of the fermentation step are likewise recovered in a more concentrated and hence more desirable form.

Such additive material is generally added in the form of inorganic salts, the micro-organisms being able to assimilate them directly but in place thereof or in addition thereto it may at times be desirable to substitute products from the vegetable kingdom. Some desirable extractive matter is already present in the sugar wort even if it be made from the trunks of mature trees, and if the leafy structure of plants is involved it will be considerable.

A concentrated form of plant extract suitable for such use is encountered in molasses, which in general is the concentrated juice of sugar cane and sugar beet with the maximum amount of sucrose eliminated. Such material is today universally utilized as raw material in the fermentation industry and may therefore be added directly to the wort thus serving two purposes namely to furnish the wort with the desirable ingredients contained therein and simultaneously enriching the wort in sugar contents.

An excellent illustration is furnished by the combination of the molasses and bagasse from sugar cane. If the cellulose in bagasse be converted into sugar as herein indicated and if this be in turn fermented for alcohol, then the total molasses yield of the factory can be advantageously added to the sugar wort, the resultant mixture fermented and then passed into the system for complete utilization. In this manner the molasses producing division would exchange one ton of its product for a credit of 60 gallons of alcohol and the bagasse division would save the cost of such additive material as has been replaced by the use of the molasses. Such an exchange would evidently be beneficial and profitable to both divisions.

The enormous diversification in the composition of plant waste renders it impossible to give a "preferred" illustration in the customary manner. In place thereof, sundry items have been separately pointed out with raw materials as far apart as various trees, sugar cane bagasse and the leaves and stumps of the pineapple. Of course, I do not limit myself in any sense to these illustrations but to the entire discard from the vegetable kingdom of every name and nature. The term "waste" may in itself be improperly applied for there are of course many types of wood and brush that have no use at present and that can be profitably worked in the manner herein indicated. Such items are evidently also a "waste" in the sense herein intended. The same observation would apply if prime trees were felled and worked exclusively by my process, no part being separated as merchantable lumber. In that event, the entire tree would constitute a "waste". In other words, if a plant can be better utilized by my process than in any other manner it becomes "plant waste" in the sense in which it is used herein.

Minor modifications are also suggested by this wide choice of raw materials as well as by the type of products desired. Thus the pineapple leaf possesses an exquisite fiber which it would be more commercial to save as such, hence it would be well to salvage the starch as herein described and then to cook the lignified cellulose residual for pulp in a standard manner.

Likewise, in place of fermenting for alcohol or yeast we may elect to work the wort for lactic, acetic, or other vegetable acid or for glycerin, etc. An alkaline carbonate or magnesia can likewise be substituted for the calcium carbonate used in the illustration under "lignin", and this modification is indicated in the flow sheet where sodium acetate is given in place of calcium acetate. Such substitutions I regard simply as "equivalents" and I have not further specified my right to these in the claims.

Having thus fully described my process, I claim:

1. The method of converting the cellulose in plant waste into sugar which comprises: passing a magma of comminuted plant waste and dilute acid in a continuous flow through a series of digesters, so interconnected and maintained in hydrostatic balance under gradually decreasing pressures from approximately 100 pounds gage to atmosphere, by the controlled escape of relief steam, that an addition of further magma at the high pressure end causes a corresponding discharge at the low pressure end, regulating the rate of flow so that the principal action shall be the conversion of cellulose into sugar and not the destruction of said sugar; separating the resultant sugar wort from the plant residue outside of the pressure vessels and digesting said residue again with acidified hydrolysing fluid in a similar manner until the cellulose shall have been removed to a satisfactory degree.

2. The method of converting the starch and cellulose in plant waste into sugar which comprises: digesting the comminuted plant waste with dilute acid in a continuous cooking operation wherein the mixture of hydrolysing fluid and plant substance is passed through a series of connecting digesters at such a rate of flow that the principal action shall be the conversion of starch into sugar and not the destruction of said sugar, the cellulose remaining inert; separating the resultant sugar wort from the lignified cellulose residual and converting said residual into a solution of sugar and a lignin residual as set forth in claim 1.

3. The method of converting the starch and cellulose of plant waste into sugar which comprises: a preliminary digestion of the plant substance with dilute acid and separation of the sugar wort from the lignified cellulose residue; a secondary treatment at higher temperature of said residue with fresh hydrolysing fluid for the production of sugar wort and a lignin residual; separating these substances from one another and returning the second wort in its normal acid condition to the initial digestion of the plant substance for starch conversion, thus augmenting the sugar content of the wort and having one instead of two fluids for subsequent treatment.

4. The method of converting the cellulose in plant waste into sugar which comprises: digesting the comminuted plant waste with dilute acid in a continuous cooking operation as set forth in claim 1; separating the resultant sugar wort from the plant residue; digesting said residue again in a similar manner until the cellulose shall have been removed to a satisfactory degree; meanwhile conserving the heat in the wort and in the relief steam by absorbing said heat in the cold hydrolysing fluid before it goes into the digesters thus preheating it and saving the equivalent in boiler steam.

5. The method of utilizing plant waste which comprises: a preliminary digestion of the plant substance with dilute acid under the temperature and pressures appropriate for the saccharification of starch; separation of the resultant sugar wort from the residue of lignified cellulose; a secondary treatment at higher temperature of said residue with fresh hydrolysing fluid for the production of sugar wort and a lignin residual, as set forth in claim 1; separating this second wort from the lignin residual; utilizing the second wort in its acid condition as the hydrolysing fluid in the preliminary starch saccharification thus obtaining a stronger wort for subsequent treatment.

ALFRED M. THOMSEN.